United States Patent
Lowder et al.

(10) Patent No.: US 12,444,896 B2
(45) Date of Patent: Oct. 14, 2025

(54) OPTICAL FIBER DEVICES AND METHODS FOR DIRECTING STIMULATED RAMAN SCATTERING (SRS) LIGHT OUT OF A FIBER CORE AND INTO A CLADDING

(71) Applicant: nLIGHT, Inc., Camas, WA (US)

(72) Inventors: Tyson L. Lowder, Vancouver, WA (US); Dahv A.V. Kliner, Portland, OR (US); C. Geoffrey Fanning, Portland, OR (US)

(73) Assignee: nLIGHT, Inc., Camas, WA (US)

( * ) Notice: Subject to any disclaimer, the term of this patent is extended or adjusted under 35 U.S.C. 154(b) by 1147 days.

(21) Appl. No.: 17/418,699

(22) PCT Filed: Dec. 19, 2019

(86) PCT No.: PCT/US2019/067547
§ 371 (c)(1),
(2) Date: Jun. 25, 2021

(87) PCT Pub. No.: WO2020/139706
PCT Pub. Date: Jul. 2, 2020

(65) Prior Publication Data
US 2022/0094130 A1  Mar. 24, 2022

Related U.S. Application Data

(60) Provisional application No. 62/786,175, filed on Dec. 28, 2018.

(51) Int. Cl.
*H01S 3/067* (2006.01)
*G02B 6/02* (2006.01)
*H01S 3/30* (2006.01)

(52) U.S. Cl.
CPC ...... *H01S 3/06729* (2013.01); *G02B 6/02085* (2013.01); *H01S 3/302* (2013.01); *G02B 6/0208* (2013.01); *H01S 3/06733* (2013.01)

(58) Field of Classification Search
CPC .................. H01S 3/06729; H01S 3/06733
See application file for complete search history.

(56) References Cited

U.S. PATENT DOCUMENTS

| | | |
|---|---|---|
| 5,751,415 A | 5/1998 | Smith et al. |
| 6,100,975 A | 8/2000 | Smith et al. |

(Continued)

FOREIGN PATENT DOCUMENTS

| | | | |
|---|---|---|---|
| CN | 104112970 A | * | 10/2014 |
| TW | I431347 B | | 3/2014 |

OTHER PUBLICATIONS

International Search Report and Written Opinion for International Patent Application No. PCT/US2019/067547, mailed Mar. 26, 2020, 7 pages.

(Continued)

*Primary Examiner* — Eric L Bolda
(74) *Attorney, Agent, or Firm* — Wiley Rein LLP

(57) ABSTRACT

Optical fiber devices, systems, and methods for separating Raman spectrum from signal spectrum. Once separated, the Raman spectrum may be suppressed (e.g., as a result of a reduction in gain from the signal spectrum, and/or through dissipation of the Raman spectrum energy), while the signal spectrum may be propagated in one or more guided modes of a fiber system. In some embodiments, a fiber system may include a chirped fiber Bragg grating (CFBG) or a long period fiber grating (LPFG), each configured to couple a core propagation mode into a cladding propagation mode with an efficiency that is higher for Raman spectrum than for signal spectrum. A fiber system further may include a cladding light stripper (CLS) configured to preferentially remove cladding modes containing the Raman component.

15 Claims, 6 Drawing Sheets

(56) References Cited

U.S. PATENT DOCUMENTS

| | | | |
|---|---|---|---|
| 6,404,956 B1 | 6/2002 | Brennan, III et al. | |
| 9,397,464 B2* | 7/2016 | Muendel | H01S 3/094007 |
| 2009/0296743 A1 | 12/2009 | Islam | |
| 2010/0027938 A1 | 2/2010 | Digiovanni et al. | |
| 2016/0111851 A1* | 4/2016 | Kliner | H01S 3/0675 |
| | | | 359/334 |
| 2018/0217322 A1* | 8/2018 | Brochu | G02B 6/02085 |
| 2022/0190545 A1* | 6/2022 | Kanskar | H01S 3/0675 |

OTHER PUBLICATIONS

Nodop, et al., "Suppression of simulated Raman scattering employing long period gratings in double-clad fiber amplifiers", Optics Letter, Optical Society of America, US, vol. 35, No. 17, Sep. 1, 2010, XP001557105, 3 pages.

* cited by examiner

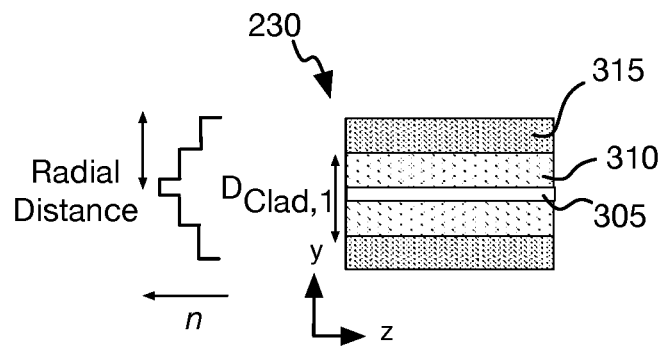
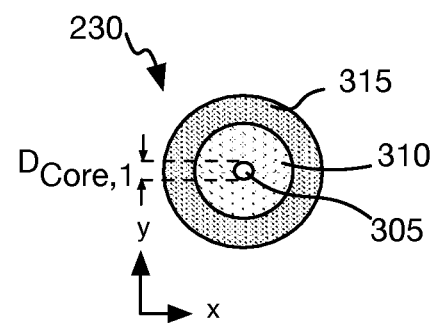
FIG. 3A          FIG. 3B
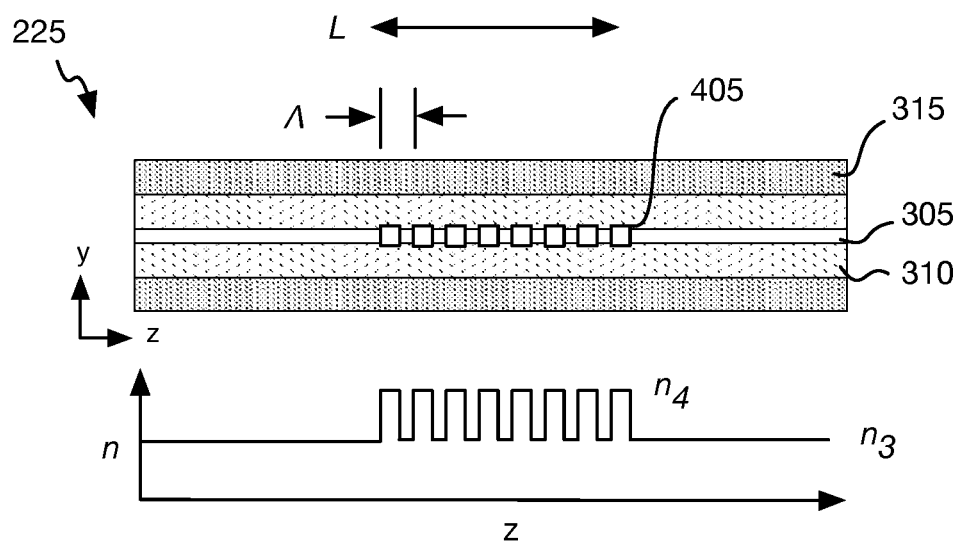
FIG. 4A
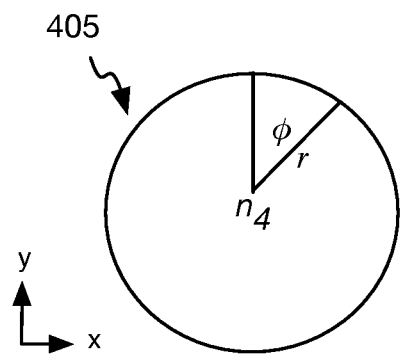
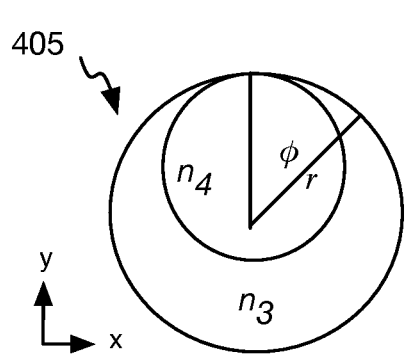
FIG. 4B          FIG. 4C

OPTICAL FIBER DEVICES AND METHODS FOR DIRECTING STIMULATED RAMAN SCATTERING (SRS) LIGHT OUT OF A FIBER CORE AND INTO A CLADDING

RELATED APPLICATIONS

This application is a National Stage of International Application No. PCT/US2019/067547, filed Dec. 19, 2019, which claims priority to U.S. Provisional Patent Application Ser. No. 62/786,175, filed on Dec. 28, 2018 and titled "Optical Fiber Devices and Methods for Directing Stimulated Raman Scattering (SRS) Light Out of a Fiber Core & Into a Cladding," which are hereby incorporated by reference in their entireties.

BACKGROUND

The fiber laser industry continues to increase laser performance metrics, such as average power, pulse energy and peak power. Pulse energy and peak power are associated with the storage and extraction of energy in the fiber while mitigating nonlinear processes that can have adverse impacts on the temporal and spectral content of the output pulse. Stimulated Raman Scattering (SRS) light is the result of one such nonlinear process associated with vibrations of the fiber media (e.g., glass). SRS is therefore typically an undesired byproduct of fiber laser and/or fiber power amplifier signal light passing through the optical fibers that make up these systems.

Generation of SRS light can reduce power in an intended signal output wavelength. SRS generation can also destabilize laser emission resulting in undesired output power fluctuations. SRS generation may also have detrimental effect on the spatial profile of laser system emission. SRS may also be re-introduced in laser and amplifier systems by reflections from objects internal to, or external to, the laser system, such as optics used to manipulate the laser or amplifier output, or the workpiece to which the laser light output is applied. Such reflections can also destabilize the laser emission. Once generated, a laser and/or amplifier of a fiber system may amplify SRS light to the point of causing catastrophic damage to components internal to the system (e.g., a fiber laser, or fiber amplifier). The SRS light may also be detrimental to components external to the fiber system because the external components may not be specified for the wavelength of the SRS light. This mismatch in wavelength between what is delivered versus what is expected can lead to undesirable performance at the workpiece or may cause an eye safety concern for the external system in which the fiber system was integrated. As such, it may be desirable to suppress SRS generation within a fiber system, remove SRS light from a fiber system, and/or otherwise mitigate one or more of the undesirable effects of SRS.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIGS. 3A and 3B are longitudinal and transverse cross-sectional views of a fiber, in accordance with some embodiments;

FIG. 4A is a longitudinal cross-sectional view of a fiber length that includes a long period fiber grating (LPFG), in accordance with some embodiments;

FIG. 4B is a transverse cross-sectional view through one portion of the LPFG illustrated in FIG. 4A in accordance with a symmetric grating embodiment;

FIG. 4C is a transverse cross-sectional view through one portion of the LPFG illustrated in FIG. 4A in accordance with an asymmetric grating embodiment;

DETAILED DESCRIPTION

Figure 1:
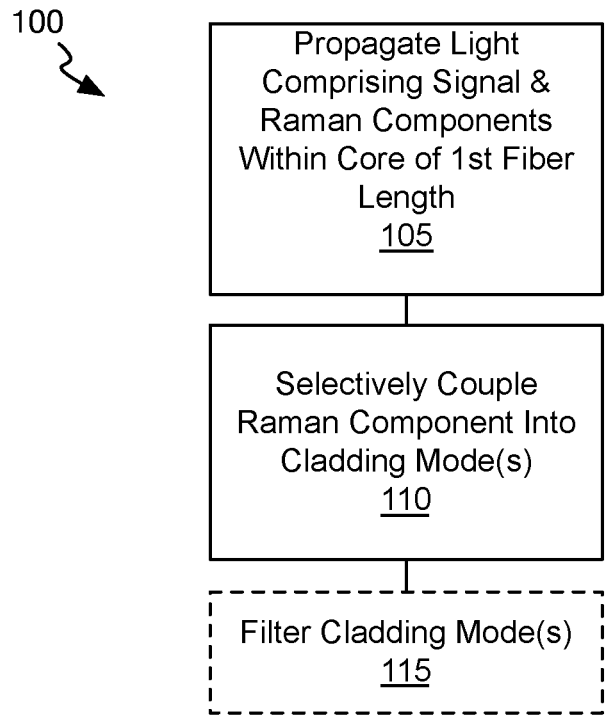
FIG. 1 is a flow chart illustrating methods for selectively coupling Raman spectrum from a core propagation mode of a fiber to a cladding propagation mode, in accordance with some embodiments.

One or more embodiments are described with reference to the enclosed figures. While specific configurations and arrangements are depicted and discussed in detail, it should be understood that this is done for illustrative purposes only. Persons skilled in the relevant art will recognize that other configurations and arrangements are possible without departing from the spirit and scope of the description. It will be apparent to those skilled in the relevant art that techniques and/or arrangements described herein may be employed in a variety of other systems and applications other than what is described in detail herein.

Reference is made in the following detailed description to the accompanying drawings, which form a part hereof and illustrate exemplary embodiments. Further, it is to be understood that other embodiments may be utilized and structural and/or logical changes may be made without departing from the scope of claimed subject matter. It should also be noted that directions and references, for example, up, down, top, bottom, and so on, may be used merely to facilitate the description of features in the drawings. Therefore, the following detailed description is not to be taken in a limiting sense and the scope of claimed subject matter is defined solely by the appended claims and their equivalents.

In the following description, numerous details are set forth. However, it will be apparent to one skilled in the art, that the present invention may be practiced without these specific details. In some instances, well-known methods and devices are shown in block diagram form, rather than in detail, to avoid obscuring the present invention. Reference throughout this specification to "an embodiment" or "one embodiment" means that a particular feature, structure, function, or characteristic described in connection with the embodiment is included in at least one embodiment of the invention. Thus, the appearances of the phrase "in an embodiment" or "in one embodiment" in various places throughout this specification are not necessarily referring to the same embodiment of the invention. Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items.

The terms "coupled" and "connected," along with their derivatives, may be used herein to describe functional or structural relationships between components. It should be understood that these terms are not intended as synonyms for each other. Rather, in particular embodiments, "connected" may be used to indicate that two or more elements are in direct physical, optical, or electrical contact with each other. "Coupled" may be used to indicated that two or more elements are in either direct or indirect (with other intervening elements between them) physical or electrical contact with each other, and/or that the two or more elements co-operate or interact with each other (e.g., as in a cause an effect relationship).

The terms "over," "under," "between," and "on" as used herein refer to a relative position of one component or material with respect to other components or materials where such physical relationships are noteworthy.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C.

The term "beam diameter" is defined as the distance across the center of the beam along an axis for which the irradiance (intensity) equals $1/e^2$ of the maximum irradiance. While examples disclosed herein generally use beams that propagate in azimuthally symmetric modes, elliptical or other beam shapes can be used, and beam diameter can be different along different axes. Circular beams are characterized by a single beam diameter. Other beam shapes can have different beam diameters along different axes. The term "intensity distribution" refers to optical intensity as a function of position along a line (1D profile) or on a plane (2D profile). The line or plane is usually taken perpendicular to the propagation direction of the light. It is a quantitative property.

The term "luminance" is a photometric measure of the luminous intensity per unit area of light traveling in a given direction. The term "numerical aperture" or "NA" of an optical system is a dimensionless number that characterizes the range of angles over which the system can accept or emit light. The term "optical intensity" is not an official (SI) unit, but is used to denote incident power per unit area on a surface or passing through a plane. The term "power density" refers to optical power per unit area, although this is also referred to as "optical intensity" and "fluence." The term "radial beam position" refers to the position of a beam in a fiber measured with respect to the center of the fiber core in a direction perpendicular to the fiber axis. The term "radiance" is the radiation emitted per unit solid angle in a given direction by a unit area of an optical source (e.g., a laser). Radiance may be altered by changing the beam intensity distribution and/or beam divergence profile or distribution. The term "refractive-index profile" or "RIP" refers to the refractive index as a function of position along a line (1D) or in a plane (2D) perpendicular to the fiber axis. Many fibers are rotationally, or azimuthally, symmetric, in which case the 1D RIP is identical for any azimuthal angle. The term "optical power" is energy per unit time, as is delivered by a laser beam, for example. The term "guided light" describes light confined to propagate within an optical waveguide. The term "core mode" is a guided propagation mode supported by a waveguide within one or more core layers of an optical fiber. The term "cladding mode" is a guided propagation mode supported by a waveguide within one or more cladding layers of an optical fiber.

Described herein are optical fiber devices, systems, and methods suitable for one or more of suppressing SRS generation within a fiber system, removing SRS light from a fiber system, and/or otherwise mitigating one or more of the undesirable effects of SRS within a fiber system.

In accordance with some embodiments where light can be propagated by an optical fiber predominantly in a core propagation mode, a Raman component $I_r$ is selectively coupled into a propagation mode supported by a cladding layer of the fiber.

FIG. 1 illustrates methods 100 for selectively coupling Raman spectrum energy between core and cladding modes of an optical fiber, in accordance with some embodiments. Methods 100 begin at block 105 where light is propagated over a first length of fiber predominantly in a core propagation mode. The light propagated at block 105 has both a signal component $I_s$ and a Raman component $I_r$. At block 110, light is coupled into a cladding mode as a function of wavelength. The dominant modes of propagation for the two components $I_r$, $I_s$, may be made separate by a grating tuned to discriminate between component wavelengths $\lambda_r$, $\lambda_s$. In some exemplary embodiments, a fiber grating employed at block 110 is to make a cladding mode a dominant propagation mode of the Raman component $I_r$ while the signal component $I_s$ is maintained in a core propagation mode. With the Raman component then propagating in a different mode than the signal component, the Raman component may experience lower gain from the signal component as a result of relatively lower overlap between their respective propagation modes. For some further embodiments, methods 100 may optionally continue at block 115 where the signal component $I_s$ is retained preferentially over the Raman component $I_r$. In other words, the cladding mode(s) comprising the Raman component $I_r$ is(are) filtered, for example with a cladding light stripper that increases propagation losses for the Raman component.

Figure 2:
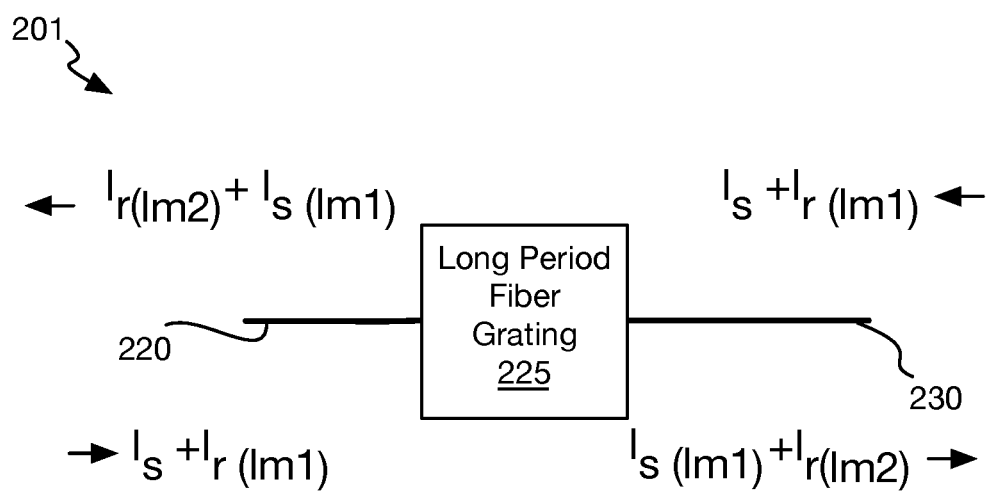
FIG. 2 is a schematic of a device to selectively couple Raman spectrum from a core propagation mode of a fiber to a cladding propagation mode, in accordance with some embodiments.

FIG. 2 is a schematic of a device 201 to selectively couple Raman spectrum energy from a fiber core propagation mode to a cladding propagation mode, in accordance with some long period fiber grating (LPFG) embodiments. Device 201 may perform methods 100, for example. As shown, device 201 includes a Raman LPFG 225 coupled to propagate light between a first fiber length 220 and a second fiber length 230. Light propagated within fiber lengths 220 and 230 may comprise a signal component $I_s$ and a Raman component $I_r$. The signal component $I_s$ has some range of power per frequency or wavelength (W/nm) over a predetermined signal spectrum comprising one or more signal wavelengths (e.g., with a micrometer center wavelength, such as 1050 nm, etc.). Similarly, the Raman component $I_r$ has some range of some power per frequency or wavelength (W/nm) over a Raman power spectrum comprising one or more Raman wavelengths. In general, the Raman component $I_r$ can be expected to span wavelengths longer than those of the signal component $I_s$ (e.g., a Raman-shifted center wavelength, such as 1100 nm, etc.). The Raman component $I_r$ may also have a wider band than the signal component $I_s$.

As shown, within fiber length 220 both the signal component $I_s$ and the Raman component $I_r$ propagate in a core guided mode $lm_1$. In some examples, the core guided mode is a linear polarized mode $LP_{lm}$, with one embodiment being the linearly polarized fundamental transverse mode of the optical fiber core, $LP_{01}$. $LP_{01}$ has desirable characteristics in terms of beam shape, minimal beam expansion during propagation through free space (often referred to as "diffraction limited"), and optimum focus-ability. Hence, fundamental mode $LP_{01}$ propagation is often advantageous in the fiber laser industry.

Raman LPFG 225 is to couple at least some of the light in the core propagation mode into a cladding (guided) mode supported by fiber length 230. Raman LPFG 225 has a wavelength dependence, which is tuned to interact with the Raman spectrum more than the signal spectrum. Because of the wavelength selectivity, Raman LPFG 225 has higher coupling efficiency within the Raman spectrum, coupling Raman spectrum energy into cladding modes more efficiently than signal spectrum energy that falls outside of the band over which Raman LPFG 225 is tuned to interact. Functionally, Raman LPFG 225 may be considered a "Raman-selective," or simply a "Raman" cladding mode coupler. In some embodiments, Raman LPFG 225 is embedded within a length of fiber substantially the same as fiber length 230, for example as described in greater detail below.

In some embodiments, fiber lengths 220 and 230 are each capable of supporting only one core guided mode (i.e., fiber lengths 220 and 230 may each comprise single-mode, or SM fiber). In some alternative embodiments, fiber lengths 220 and 230 are each capable of supporting more than one core mode (i.e., fiber lengths 220 and 230 may each comprise multi-mode, or MM fiber). With Raman LPFG 225 tuned to the Raman spectrum, the signal component $I_s$ is free to propagate in the core guided mode $lm_1$ (e.g., $LP_{01}$) of fiber length 230, while the Raman component $I_r$ is instead more significantly coupled into a cladding mode $lm_2$ of fiber length 230. Raman LPFG 225 may couple a core propagation mode into one or more cladding propagation modes (e.g., any number of cladding modes supported by fiber length 230). Notably, with a long grating period (e.g., significantly greater than half a center wavelength of the Raman spectrum), within fiber length 230 the Raman component $I_r$ continues to co-propagate along with component $I_s$. This is in contrast to a fiber Bragg grating (FBG) with a significantly shorter grating period (e.g., no more than half a center wavelength of the Raman spectrum) that would reflect into a counter-propagating mode.

In the embodiment illustrated in FIG. 2, Raman LPFG 225 is symmetrical to the extent Raman component $I_r$ of light counter-propagating in a core mode (e.g., $lm_1$) of fiber length 230 is similarly selectively coupled into a cladding mode (e.g., $lm_2$) of fiber length 220 (e.g., where fiber lengths 220 and 230 comprise similar cladding architectures). The signal component $I_s$ remains free to propagate in the core guided mode $lm_1$ (e.g., $LP_{01}$) of fiber length 220.

FIGS. 3A and 3B are longitudinal and transverse cross-sectional views of fiber length 230, respectively, in accordance with some multi-clad fiber embodiments. Although a double clad fiber embodiment is illustrated, fiber length 230 may have any number of cladding layers (e.g., triple, etc.) known to be suitable for supporting a cladding mode in optical fiber. In the example illustrated in FIGS. 3A and 3B, fiber length 230 has a central core 305, and an inner cladding 310, which is annular and encompasses core 305. An annular outer cladding 315 surrounds inner cladding 310. Core 305 and inner cladding 310 may have any suitable composition (e.g., glass). Outer cladding 315 may be a polymer or also glass, for example. Although not depicted, one or more protective (non-optical) coatings may further surround outer cladding 315.

Fiber length 230 may have any suitable refractive index profile (RIP). As used herein, the "refractive-index profile" or "RIP" refers to the refractive index as a function of position along a line (e.g., x or y axis in FIG. 3B) or in a plane (e.g. x-y plane in FIG. 3B) perpendicular to the fiber axis (e.g., z-axis in FIG. 3A). In the example shown in FIG. 3B, the RIP is rotationally symmetric, in which case the RIP is identical for any azimuthal angle. Alternatively, for example as for birefringent fiber architectures, the RIP may vary as a function of azimuthal angle. Core 305, inner cladding 310, and outer cladding 315 can each have any RIP, including, but not limited to, a step-index and graded-index. A "step-index fiber" has a RIP that is substantially flat (refractive index independent of position) within fiber core 305. Inner cladding 310 may also have a substantially flat RI over $D_{Clad,1}$, with a RIP of fiber length 230 stepped at the interface between core 305 and inner cladding 310. An example of one illustrative stepped RIP suitable for a fiber laser is shown in FIG. 3A. Alternatively, one or more of core 305 and inner cladding 310 may have a "graded-index" in which the RI varies (e.g., decreases) with increasing radial position (i.e., with increasing distance from the core and/or cladding axis).

In accordance with some embodiments, core 305 is suitable for multi-mode propagation of light. With sufficient core diameter $D_{core,1}$, and/or numerical aperture (NA) contrast, fiber length 230 will support the propagation of more than one transverse optical mode within core 305. In other embodiments, core 305 has a diameter and NA sufficient to support only the propagation of a single (fundamental) transverse optical mode. In some exemplary embodiments, the core diameter $D_{Core,1}$ is in the range of 10-100 micron (μm) and the inner cladding diameter $D_{Clad,1}$ is in the range of 100-1000 μm, although other values for each are possible.

Inner cladding 310 may have an area larger than that of the core 305, and may also have a higher NA. Inner cladding 310 supports at least one propagation mode, but may support a large number of such modes. In accordance with some advantageous embodiments, Raman LPFG 225 is to couple the Raman component $I_r$ into one of these guided cladding modes. Although core 305 and inner cladding 310 is illustrated as being concentric (i.e., a centered core), they need not be. One or more of core 305 and inner cladding 310 may also be a variety of shapes other than circular, such as, but not limited to annular, polygonal, arcuate, elliptical, or irregular. Core 305 and inner cladding 310 in the illustrated embodiments are co-axial, but may alternatively have axes offset with respect to one another. Although $D_{Clad,1}$ and $D_{Core,1}$ are illustrated to be constants about a central fiber axis in the longitudinal direction (z-axis in FIG. 2A). The diameters $D_{Clad,1}$ and $D_{Core,1}$ may instead vary over a longitudinal length of fiber 230.

In further reference to device 201 (FIG. 2), fiber length 220 may have any of the properties described above for fiber length 230. In some embodiments, fiber length 220 has substantially the same core and cladding architecture as fiber length 230. For example, fiber length 220 may also comprise double-clad fiber. Fiber length 220 may be substantially identical to fiber length 230, for example having the same core and cladding architecture, compositions, and dimensions (e.g., diameters). For such embodiments, fiber length 220 may also support one or more core guided modes, and one or more cladding guided modes, such that LPFG 225 is within a substantially continuous fiber having fixed or constant architecture and properties.

Raman LPFG 225 may have a variety of architectures that are capable of coupling a target spectral bandwidth (e.g., Raman component $I_r$) from a core mode (e.g., $LP_{01}$) to a co-propagating cladding mode. This can be through direct interaction, or evanescence. Raman LPFG 225 can therefore be in the cladding, or even comprise external surface perturbations. FIG. 4A is a longitudinal cross-sectional view of a length of fiber that includes an exemplary Raman LPFG 225, in accordance with some embodiments. In this example, Raman LPFG 225 comprises refractive index (RI) perturbations 405 within at least fiber core 305 over a grating length L. In the illustrated example, Raman LPFG 225 is within a double-clad fiber, and RI perturbations 405 have a refractive index $n_4$ that is higher than a nominal core index $n_3$. For embodiments where outer cladding 315 has an index $n_1$, and inner cladding 310 has an index $n_2$, RI within mode Raman LPFG 225 may vary as $n_1 < n_2 < n_3 < n_4$. RI perturbations 405 may impact light guided within core 305 over a target range of wavelengths while light outside of the target band may be substantially unaffected by RI perturbations 405.

RI perturbations 405 are illustrated to have a period of $\Lambda$. Grating period $\Lambda$ may vary with Raman spectrum, but is at least greater than half of a center Raman wavelength. In some examples where the center Raman wavelength is 1100 nm, or more, grating period $\Lambda$ is 600 nm, or more. In some other embodiments, grating period $\Lambda$ is two or more times half the center Raman wavelength, for example ranging from 100-1000 µm. Although a fixed period fiber grating is illustrated in FIG. 4A, aperiodic (i.e., chirped), apodized, or superstructure grating embodiments may also be suitable implementations of a Raman LPFG 225. For example, chirped embodiments of long-period grating architectures may offer a wider spectral response than their periodic counterparts. Apodized embodiments of long-period grating architectures may, for example, improve mode separation of the Raman spectrum from signal spectrum. Superstructure embodiments may include a variety of long period grating structures (e.g., including both chirp and apodization structures).

A cladding mode coupling efficiency associated Raman LPFG 225 may depend not only on the amplitude of RI modulation and the grating length L, but also on a three-dimensional shape of the grating. In some embodiments, Raman LPFG 225 comprises a cylindrically symmetric grating with RI perturbations being independent of azimuthal angle (e.g., substantially orthogonal to the fiber axis) and/or core radius. FIG. 4B is a transverse cross-sectional view of Raman LPFG 225 through one RI perturbation 405, in accordance with a cylindrically, or rotationally, symmetric grating embodiment. As shown, within an x-y plane of an RI perturbation 405, the index is independent of azimuthal angle $\varphi$ and core radius r (e.g., RI being $n_4$ everywhere within the x-y plane). In some alternative embodiments, a Raman propagation mode coupler comprises a cylindrically, or rotationally, asymmetric grating with RI perturbations that are dependent on azimuthal angle (e.g., RI perturbations slanted from orthogonal to the fiber axis) and/or core radius. FIG. 4C is a transverse cross-sectional view through one portion of fiber grating 225, in accordance with cylindrically asymmetric, or "slanted," grating embodiments. As shown, the index may be dependent on azimuthal angle $\varphi$ (e.g., varying from $n_3$ to $n_4$) and/or core radius r within an x-y plane of RI perturbation 405. Such slanted grating embodiments may not be needed however as symmetric gratings embodiments may be sufficient and may have the further advantages of scattering smaller amount of light into radiation modes (rather than cladding modes).

Figure 5:
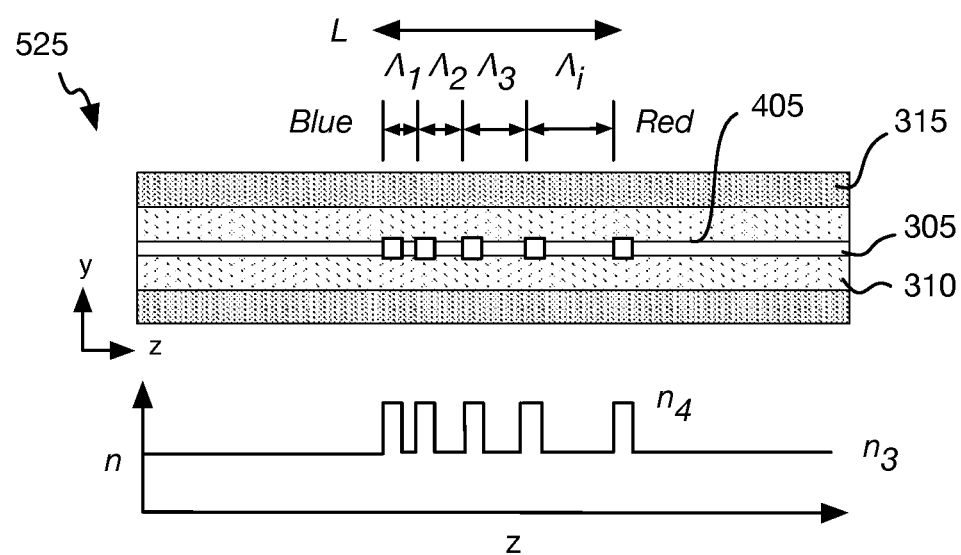
FIG. 5 is a longitudinal cross-sectional view of a fiber length that includes a chirped fiber Bragg grating (CFBG), in accordance with some embodiments.

In some other embodiments, a chirped fiber Bragg grating (CFBG) is employed to selectively couple Raman spectrum energy from a core to a cladding mode of an optical fiber. FIG. 5 is a longitudinal cross-sectional view of a fiber length that includes a Raman CFBG 525, in accordance with some embodiments. Raman CFBG 525 comprises refractive index (RI) perturbations 405 within at least fiber core 305 over a grating length L. Raman CFBG 525 is integrated into a double-clad fiber, but similar grating structures may also be integrated into other fiber architectures capable of supporting one or more guided cladding modes. As for LPFG embodiments, RI perturbations 405 have a refractive index $n_4$ that is higher than a nominal core index $n_3$. For embodiments where outer cladding 315 has an index $n_1$, and inner cladding 310 has an index $n_2$, RI within mode Raman LPFG 225 may vary as $n_1 < n_2 < n_3 < n_4$.

For CFBG 525, RI perturbations 405 have a period that varies over grating length L. CFBG 525 is therefore longitudinally asymmetric having a first "blue" end with a shortest grating period $\Lambda_1$, and a second "red" end with a longest period $\Lambda_i$. Grating periods $\Lambda_1$ and $\Lambda_i$ may each vary based on the Raman spectrum to which CFBG 525 is tuned. In exemplary embodiments, the longest grating period $\Lambda_i$ is less than grating period $\Lambda$ of LPFG embodiments while the shortest grating period $\Lambda_i$ is less than half of a center Raman wavelength. In some examples where the center Raman wavelength is around 1100 nm, the shortest grating period $\Lambda_1$ is 200-550 nm. In some such embodiments, grating period $\Lambda_i$ is less than 5 µm. The grating period may vary between the shortest and longest periods, for example by 10s or 100s of nm, according to any function (e.g., linear) over grating length L.

Figure 6:
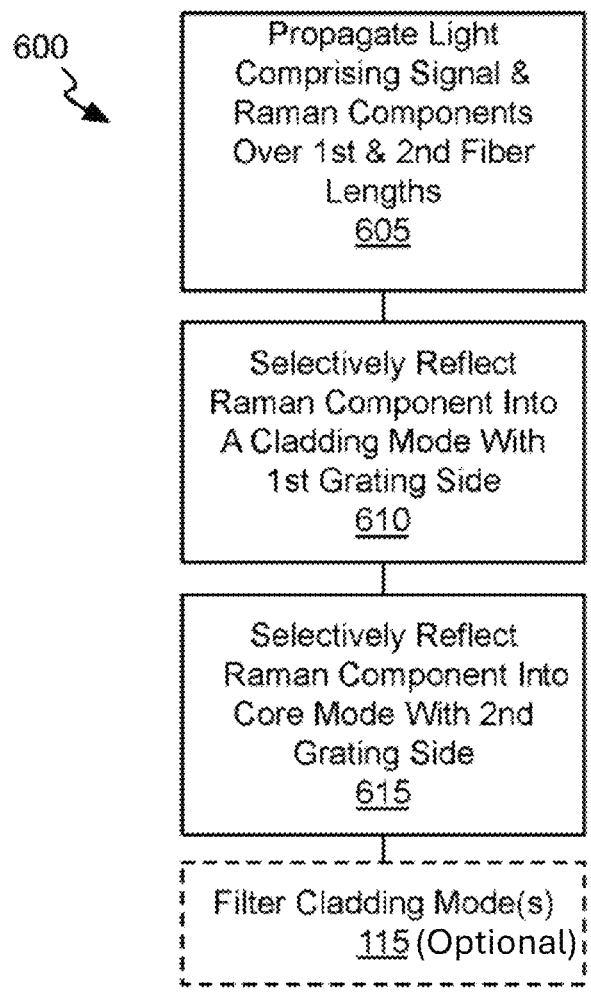
FIG. 6 is a flow chart illustrating methods of selectively removing Raman spectrum from a fiber system with a chirped fiber Bragg grating (CFBG), in accordance with some embodiments.

FIG. 6 is a flow chart illustrating methods 600 for selectively removing Raman spectrum from a fiber system with a CFBG. Methods 600 may be implemented with CFBG 525 for embodiments where one end of the grating has a sufficiently short period that the Raman component $I_r$ will satisfy a Bragg condition and be reflected into a counter-propagating mode. The variation in period over the grating length may further result in an asymmetric treatment of the Raman component $I_r$ that is dependent on the orientation of the CFBG 525 relative to the direction of light propagation within a fiber. In FIG. 6, for example, methods 600 begin at block 605 where light is propagated over first and second lengths of fiber predominantly in a core propagation mode. The first and second lengths of fiber are coupled to opposite ends of a CFBG, for example with the first fiber length coupled to the blue end and the second fiber length coupled to the red end. The light propagated at block 605 has both a signal component $I_s$ and a Raman component $I_r$. At block 610, a CFBG tuned to the Raman component wavelengths $\lambda_r$ selectively reflects the Raman component $I_r$ incident to the red end of a CFBG into primarily a counter-propagating guided cladding mode, while signal component $I_r$ incident to the red end of a CFBG is maintained primarily in a core propagation mode. At block 615, a CFBG tuned to the Raman component wavelengths $\lambda_r$ selectively reflects the Raman component $I_r$ incident to the blue end of a CFBG into primarily a counter-propagating guided core mode, while signal component $I_r$ incident to the blue end of a CFBG is maintained primarily in the core propagation mode.

Accordingly, a Raman CFBG may be employed to render a fiber cladding mode the dominant propagation mode of the Raman component $I_r$, while the signal component $I_s$ is maintained predominantly in a core propagation mode. The Raman component may again experience lower gain from the signal component as a result of lower overlap between their respective propagation modes. As such, a Raman CFBG in accordance with embodiments may be integrated into a fiber system to suppress, or otherwise mitigate, effects of Raman light within the fiber system. For some further embodiments, methods 600 may optionally continue at block 115 where the signal component $I_s$ is retained preferentially over the Raman component $I_r$. The cladding mode(s) comprising the Raman component $I_r$ may be filtered, for example with a cladding light stripper that increases propagation losses for the Raman component.

Figure 7:
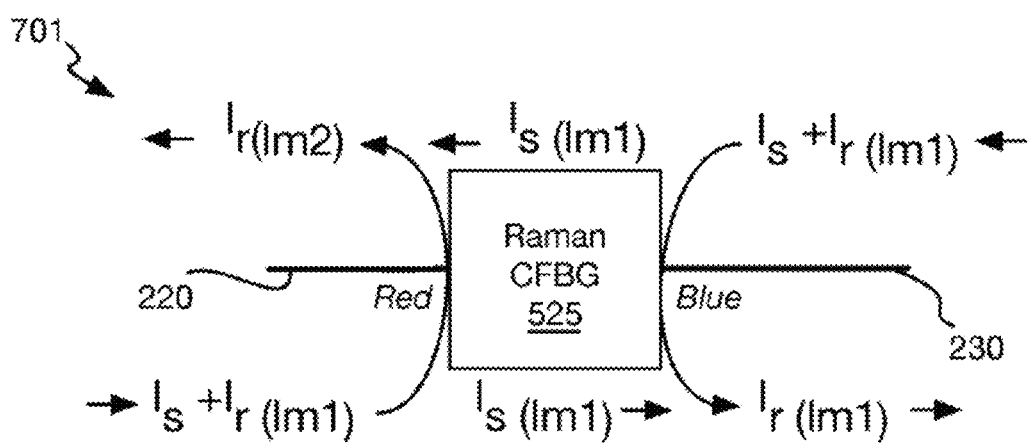
FIG. 7 is a schematic of a device to selectively couple Raman spectrum from a core propagation mode of a fiber to a cladding propagation mode, in accordance with some CFBG embodiments.

FIG. 7 is a schematic of a fiber device 701 to selectively couple Raman spectrum from a core propagation mode of a fiber to a cladding propagation mode, in accordance with some CFBG embodiments. In this example, CFBG 525 has a red end coupled to fiber length 220 and a blue end coupled to fiber length 230. CFBG 525 is to reflect Raman component $I_r$ propagated within a core propagation mode (e.g., $lm_1$) that is incident to the red end into a cladding mode (e.g., $lm_2$) where it counter-propagates within fiber length 220. CFBG 525 is not to significantly reflect signal component $I_s$, and so signal component $I_s$ is propagated within a core propagation mode (e.g., $lm_1$) of fiber length 230. For a Raman component $I_r$ propagated within a core propagation mode (e.g., $lm_1$) in a direction incident to the blue end, CFBG 525 is to reflect the Raman component in the core propagation mode (e.g., $lm_1$) where it is counter-propagated within fiber length 230. The signal component $I_s$, in contrast, freely propagates within a core propagation mode (e.g., $lm_1$) of fiber length 220.

Figure 8A:
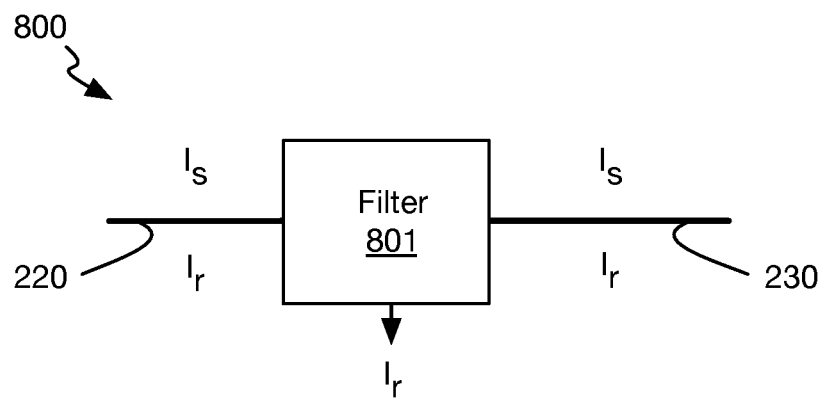
FIG. 8A is a schematic of a device to selectively remove Raman spectrum energy from a fiber system, in accordance with some embodiments.
Figure 8B:
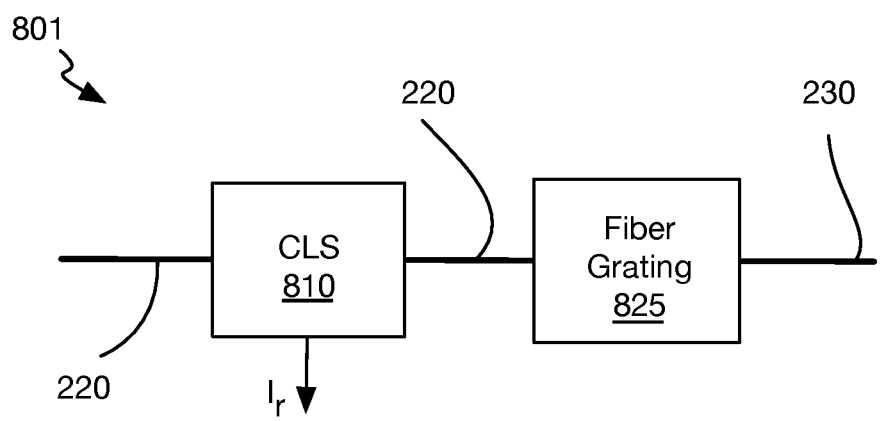
FIG. 8B is a schematic of a device to selectively remove Raman spectrum energy from a fiber system.

FIG. 8A is a schematic of a fiber device 800 to selectively remove Raman spectrum energy from a fiber system, in accordance with some embodiments. Fiber device 800 includes a Raman filter 801 coupled to receive light propagated in fiber 220 that again includes both signal and Raman components $I_s$, $I_r$. Raman filter 801 is to discriminate the Raman component $I_r$ from the signal component $I_s$, upon which the Raman component $I_r$ may be selectively routed to a destination different than that of the signal component $I_s$, which is to propagate in fiber length 230. As a result of filtering, light propagated within fiber length 220 and/or fiber length 230 has a reduced Raman component $I_r$ (of lower total Raman spectrum energy). Once filtered, Raman component $I_r$ may be selectively dissipated and/or suppressed.

In some embodiments, Raman filter 801 includes a fiber grating 825 that is to couple Raman spectrum energy into one or more fiber cladding modes selectively to signal spectrum energy, which is maintained in a fiber core propagation mode. Raman filter 801 further includes a cladding light stripper (CLS) 810, which is further configured to remove and/or dissipate cladding light that includes the Raman spectrum energy introduced by fiber grating 825.

CLS 810 may comprise any suitable free space or fiber-based device known to reduce guided cladding light. In some embodiments, CLS 810 comprises a length of optical fiber having a cladding architecture that unguides cladding light. For example, a layer of a high-index material (e.g., exceeding the index of an inner cladding material, or exceeding the index of a material index-matched to the inner cladding material) may be applied onto the inner cladding (or index-matched material) within a fiber length where the outer cladding has been removed. The high-index material, often a polymer, has a suitable index contrast with the inner cladding (or index-matched material) to "un-guide" light propagating with the inner cladding. In some other examples where CLS 810 is embedded with a portion of fiber length 220, one or more features are introduced into at least one of an outer cladding or an inner cladding to perturb light propagating in the cladding mode within that portion of fiber length 220. For example, an outer surface of the inner cladding may be roughened, or much larger features on the order of the cladding diameter, may be milled into the inner cladding for the purpose of scattering, reflecting, refracting and/or diffracting out light. In some exemplary embodiments, CLS 810 comprises a fiber length with an inner cladding that has one or more surface regions recessed from a nominal cladding diameter to perturb light propagating in the inner cladding. For an in-depth description of a number of structures that may be patterned into the fiber cladding, the interested reader is referred to International Patent Application No. PCT/US19/52241 titled "Optical Fiber Cladding Light Stripper," and under common ownership and/or assignment.

CLS 810 may also comprise one or more fiber transitions where two fibers having different architectures join and cladding light of one fiber is lost at the transition as a result of the different fiber architectures. For example, CLS 810 may include a fiber splice between different core and/or cladding layer dimensions that leak, or otherwise lose, at least the cladding propagation mode of the Raman component $I_r$. In other embodiments, CLS 810 may comprise a length of single clad fiber joined to multi-clad fiber (e.g., a double-clad fiber). Signal component $I_s$, may be propagated as a fundamental core mode (e.g., $LP_{01}$) within both the single and multi-clad fibers. However, Raman component $I_r$ propagated in the multi-clad fiber may then be lost from the system at the single clad fiber transition and/or within the length of single clad fiber.

Hence, according to the embodiments described above, once core and cladding modes are made the dominant propagation modes of the Signal component $I_s$ and the Raman component $I_r$, respectively, a fiber system may benefit from reduced gain of the Raman component $I_r$, and, if desired, a fiber system may further include a filter selective to cladding modes as a means of further reducing Raman light within fiber system.

Figure 9A:
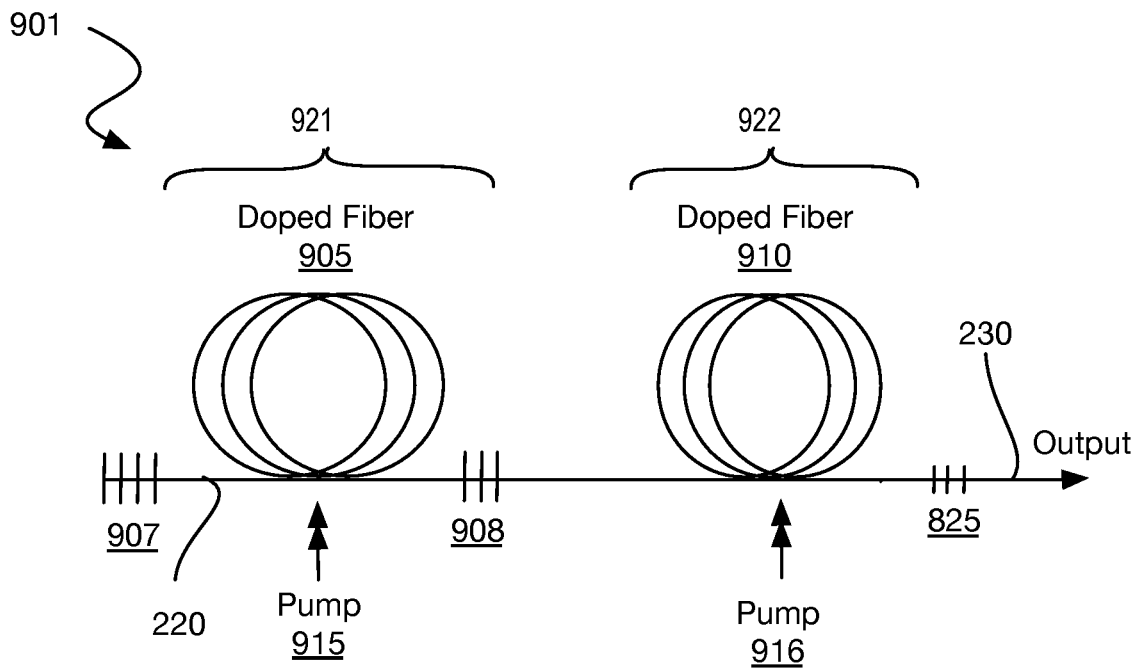
FIG. 9A is a schematic of a fiber system comprising an optical oscillator, an optical power amplifier, and a LPFG or CFBG, in accordance with some embodiments.

One or more of the fiber devices described above may be incorporated into a larger fiber system, for example one that includes a fiber optic laser oscillator or resonant cavity, and/or includes a fiber optical power amplifier. FIG. 9A, for example, is a schematic of a fiber laser system 901 that comprises both an optical oscillator 921, and an optical power amplifier 922. System 901 further includes a Raman fiber grating 825 suitable for selectively coupling Raman spectrum into cladding modes of fiber 230. In the presence of Raman fiber grating 825, Raman spectrum propagating in cladding modes of laser system 901 can be expected to have lower gain by signal spectrum due to lower mode overlap. As such, Raman fiber grating 825 may be employed with or without the further integration of a Raman spectrum filter suitable for selectively filtering those cladding modes predominantly conveying Raman spectrum, in accordance with some further embodiments.

Fiber optic oscillator 921 is to generate an optical beam by exciting a signal spectrum of light. Oscillator 921 comprises an optical cavity defined by a strong fiber grating 907 and a fiber-to-fiber coupler (FFC) 908 with a doped fiber length 905 between grating 907 and FFC 908. Doped fiber length 905 may comprise a variety of materials, such as, $SiO_2$, $SiO_2$ doped with $GeO_2$, germanosilicate, phosphorus pentoxide, phosphosilicate, $Al_2O_3$, aluminosilicate, or the like, or any combinations thereof. In some embodiments, the dopants are optically active and may comprise rare-earth ions such as $Er^{3+}$ (erbium), $Yb^{3+}$(ytterbium), $Nd^{3+}$(neodymium), $Tm^{3+}$ (thulium), $Ho^{3+}$(holmium), or the like, or any combination thereof to provide optical power gain. Doped fiber length 905 may comprise a multi-clad fiber, for example substantially as described above for fiber length 230, in which at least the core is doped with gain media. Doped fiber length 905 may alternatively comprise a single-clad fiber, or any other fiber architecture known to be suitable for a fiber laser. Fiber oscillator 921 is optically coupled to a pump light source 915, which may be a solid state diode laser, or lamp, for example. Where fiber oscillator 921 comprises a multi-clad fiber, pump light source 915 may be coupled into a cladding layer of doped fiber length 905 in either a co-propagating or counter-propagating manner. In some embodiments, doped fiber length 905 comprises multi-mode fiber supporting multiple propagation modes within a fiber core (e.g., substantially as described above for fiber 230). However, in some alternative embodiments doped fiber length 905 comprises a single-mode fiber capable of supporting only one propagation mode within the fiber core.

Fiber power amplifier 922 is to increase radiance of at least the signal spectrum excited by oscillator 921. Fiber amplifier 922 is optically coupled to a pump light source 916, which may also be a solid state diode laser, or lamp, for example. Fiber power amplifier 922 includes a doped fiber length 910, which may have any of the properties described above for doped fiber length 905. For example, in some embodiments, doped fiber length 910 comprises an optically active dopant such as rare-earth ions like $Er^{3+}$ (erbium), $Yb^{3+}$(ytterbium), $Nd^{3+}$(neodymium), $Tm^{3+}$(thulium), $Ho^{3+}$ (holmium), or the like, or any combination thereof known to be suitable for providing optical power gain. Doped fiber length 910 may comprise a multi-clad fiber, for example substantially as described above for fiber length 230. In some embodiments, doped fiber length 910 comprises a multi-mode fiber supporting multiple propagation modes within a fiber core (e.g., substantially as described above for fiber 230). In some advantageous embodiments doped fiber length 905 comprises single-mode fiber capable of supporting only one guided propagation mode within the fiber core, and doped fiber length 910 comprises a multi-mode fiber capable of supporting multiple propagation modes within the fiber core.

In accordance with some embodiments, fiber grating 825 is positioned between an output of fiber system 901 and oscillator 921. The system output may be coupled to a delivery fiber that is further coupled to a process head, for example. For some embodiments further including an optical power amplifier (e.g., power amplifier 922), the Raman grating is positioned between the fiber system output and the amplifier (e.g., with grating 825 separated from oscillator 921 by power amplifier 922).

For embodiments where grating 825 comprises a CFBG (e.g., CFBG 225 substantially as described above), grating 825 may be oriented with the blue end proximal to an output of fiber system 901 and a red end proximal to fiber oscillator 921 (and/or proximal to fiber power amplifier 922). In this orientation, Raman light propagating in fiber length 230 toward fiber oscillator 921 in a core mode of fiber 230 (e.g., back-reflected from a workpiece into a process head coupled to fiber system 901) is reflected by fiber grating 825 back toward the fiber system output in the core mode. The CFBG will therefore exclude back-reflected Raman spectrum from fiber oscillator 921 and/or fiber power amplifier 922. Raman light propagating from fiber oscillator 921 in a core mode of fiber 220 (e.g., generated within doped fiber lengths 905 and/or 910) will be reflected by fiber grating 825 into cladding modes of fiber length 230. Raman spectrum will therefore return to fiber oscillator 921 and/or fiber power amplifier 922 predominantly in cladding modes where gain by the signal spectrum is greatly reduced. This general system architecture may be extended for any number of optical oscillators. For example, one CFBG may be so positioned for each optical oscillator upstream of an optical multiplexer/combiner. This general system architecture may also be extended for any number of optical power amplifier gain stages. For example, one CFBG may be so positioned between two adjacent fiber power amplifier gain stages.

For embodiments where fiber grating 825 comprises a LPFG (e.g., LPFG 525 substantially as described above), fiber grating 825 may be positioned substantially as illustrated in FIG. 9A, or may alternatively be positioned between oscillator 921 and optical power amplifier 922. During operation of system 901, the LPFG will couple Raman spectrum that is propagating in a core mode to or from (e.g., back-reflected) the fiber system output to co-propagating cladding modes where gain by the signal spectrum is greatly reduced.

Figure 9B:
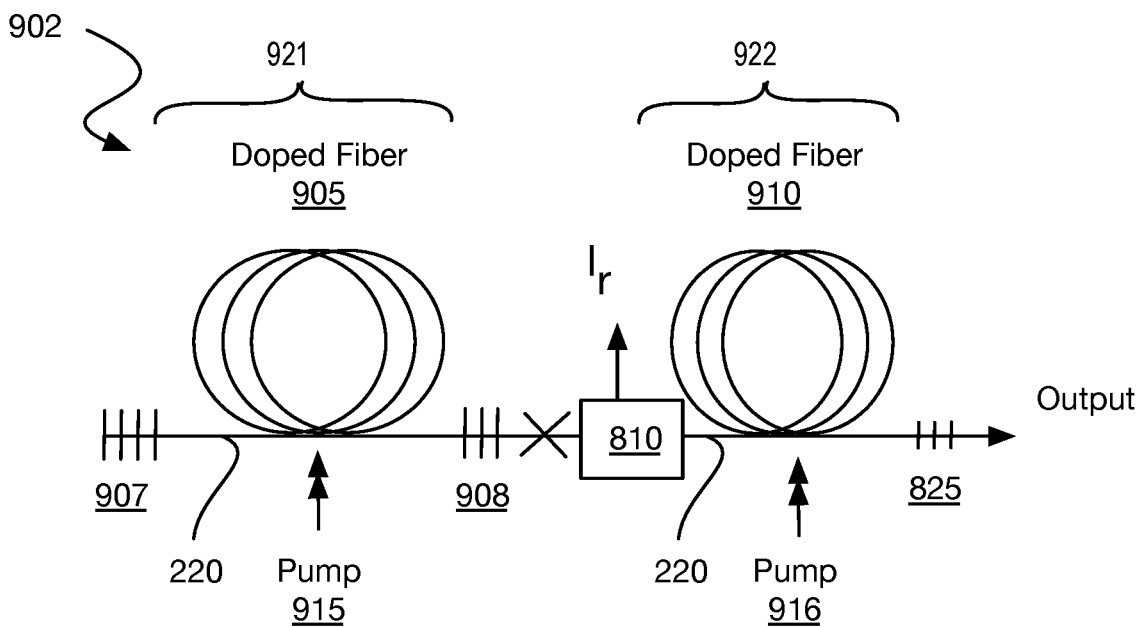
FIG. 9B is a schematic of a fiber system comprising an optical oscillator, an optical power amplifier, a LPFG or CFBG, and a cladding light stripper, in accordance with some further embodiments.

As further illustrated in FIG. 9B, a fiber system 902 may further include CLS 810. In the example shown, CLS 810 is implemented between doped fiber lengths 905 and 910. Such a system architecture is well-suited to either LPFG or CFBG embodiments of fiber grating 825. For CFBG embodiments, Raman component $I_r$ that is reflected to counter propagate in cladding modes toward CLS 810 will be stripped by CLS 810 while signal spectrum $I_s$ is free to propagate within fiber length 230 toward an output of fiber system 902. For LPFG embodiments, back reflected Raman component $I_r$ coupled to co-propagate in cladding modes toward CLS 810 will likewise be stripped by CLS 810 while signal spectrum $I_s$ is free to propagate within fiber length 230 toward an output of fiber system 902.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure. It will be recognized that the invention is not limited to the embodiments so described, but can be practiced with modification and alteration without departing from the scope of the appended claims. The above embodiments may include the undertaking of only a subset of such features, undertaking a different order of such features, undertaking a different combination of such features, and/or undertaking additional features than those features explicitly listed. The scope of the invention should therefore be determined with reference to the appended claims, along with the full scope of equivalents to which such claims are entitled.

What is claimed is:

1. An optical fiber device, comprising:
a first and a second length of optical fiber, each of the lengths of optical fiber comprising a core and two or more cladding layers, wherein the core supports at least a first propagation mode for light comprising both signal spectrum and Raman spectrum, the Raman spectrum comprises one or more first wavelengths that are longer than one or more second wavelengths of the signal spectrum, the two or more cladding layers of at least the first length of optical fiber comprise an inner cladding layer and an outer cladding layer in contact with the inner cladding layer; and
a chirped fiber Bragg grating (CFBG) between the first and second lengths of fiber, the CFBG to couple at least some of the light propagated in the first propagation mode into one or more cladding modes of the first or second length of fiber with a greater coupling efficiency over the Raman spectrum than over the signal spectrum, the CFBG comprises a third length of optical fiber further comprising a core, an inner cladding layer, and an outer cladding layer in contact with the inner cladding layer, wherein a refractive index of the core alternates between two values as a function of a periodicity of the CFBG that varies over the third length of optical fiber;
an optical oscillator to excite at least the signal spectrum, and the optical oscillator coupled to the first length of optical fiber with the CFBG between the optical oscillator and the second length of optical fiber, wherein the CFBG is to couple the first propagation mode into one or more counter-propagating cladding modes supported by the inner cladding layer of the first length of optical fiber; and
a cladding light stripper CLS to dissipate light from the cladding mode, the CLS comprising a fourth length of optical fiber having one or more cladding features to perturb light propagating in the cladding mode, the fourth length of optical fiber being located between the optical oscillator and the CFBG to exclude the light from the cladding mode from reaching the optical oscillator.

2. The optical fiber device of claim 1, wherein the CFBG has a refractive index that varies azimuthally within the core.

3. The optical fiber device of claim 1, wherein the CFBG has a direction of chirp relative to the optical oscillator to reflect at least a portion of the light within the Raman spectrum that propagates toward the optical oscillator in the first propagation mode of the first fiber length into light that counter-propagates away from the optical oscillator in the first propagation mode of the first fiber length.

4. The optical fiber device of claim 1, wherein:
the optical oscillator comprises a length of single mode (SM) fiber having a core that supports only the first propagation mode; and
the second length of fiber comprises multi-mode (MM) fiber, the core of which supports one or more guided propagation modes in addition to the first propagation mode.

5. The optical fiber device of claim 4, further comprising an optical power amplifier between the optical oscillator and the CFBG, the optical power amplifier comprising a length of MM fiber having a core doped with a gain medium to excite at least the signal spectrum.

6. An optical fiber device, comprising:
a first and a second length of optical fiber, each of the lengths of fiber comprising a core and two or more cladding layers, wherein the core supports at least a first propagation mode for light comprising both signal spectrum and Raman spectrum, the Raman spectrum comprises one or more first wavelengths that are longer than one or more second wavelengths of the signal spectrum, the two or more cladding layers of each of the first and second lengths of optical fiber comprise an inner cladding layer and an outer cladding layer; and
a long period fiber grating (LPFG) between the first and second lengths of fiber, the LPFG having a period greater than half a center wavelength of the Raman spectrum, and the LPFG to couple at least some of the light propagated in a first guided mode into a cladding mode with a greater coupling efficiency over the Raman spectrum than over the signal spectrum, wherein the LPFG comprises a third length of optical fiber comprising a core and an inner cladding layer and an outer cladding layer, wherein a refractive index of the core varies between at least two values over the third length, and with a period that exceeds 100 um;
an optical oscillator to excite at least the signal spectrum, and the optical oscillator coupled to the first length of optical fiber with the LPFG between the optical oscillator and the second length of optical fiber, wherein the LPFG is to couple the first propagation mode into one or more co-propagating cladding modes supported by the inner cladding layer of each of the first and second lengths of optical fiber; and
a cladding light stripper CLS to dissipate light from the cladding mode, wherein the CLS comprises a fourth length of optical fiber having one or more cladding features to perturb light propagating in the cladding mode, the fourth length of optical fiber is located between the optical oscillator and the LPFG to exclude the light from the cladding mode from reaching the optical oscillator.

7. The optical fiber device of claim 6, wherein the LPFG has a refractive index that varies azimuthally within the core.

8. The optical fiber device of claim 6, wherein:
the optical oscillator comprises a length of single mode (SM) fiber having a core that supports only the first propagation mode; and
the second length of fiber comprises multi-mode (MM) fiber, the core of which supports one or more guided modes in addition to the first propagation mode.

9. The optical fiber device of claim 8, further comprising an optical power amplifier between the optical oscillator and the LPFG, the optical power amplifier comprising a length of MM fiber having a core doped with a gain medium to excite at least the signal spectrum.

10. The optical fiber device of claim 6, wherein:
the one or more cladding layers of at least the second length of fiber further comprise an inner cladding layer and an outer cladding layer; and the grating is to couple the first guided mode into a cladding mode supported by the inner cladding layer.

11. A method of filtering Raman spectrum from an optical fiber system, the method comprising:
propagating light in a core mode of a first length of optical fiber, wherein the first length of fiber comprises a core and one or more cladding layers, and the light comprises both signal spectrum and Raman spectrum;
coupling at least some of the light from the core mode into a cladding mode with a fiber grating that has greater coupling efficiency over the Raman spectrum than over the signal spectrum, wherein the fiber grating comprises a chirped fiber Bragg grating (CFBG) or a long period fiber grating (LPFG); and
propagating the cladding mode in a second length of optical fiber in the case of the LPFG or the first length of optical fiber in the case of the CFBG, wherein the second length of fiber comprises a core and one or more cladding layers; and
stripping, with a cladding light stripper CLS, the light from the cladding mode to exclude light from the cladding mode from reaching an optical oscillator located between the first and second lengths of optical fiber,
wherein the CLS is disposed between the optical oscillator and the CFBG or LPFG.

12. The method of claim 11, wherein:
the one or more cladding layers of both the first and second lengths of fiber further comprise an inner cladding layer and an outer cladding layer; and
coupling at least some of the light from the core mode into the cladding mode further comprises coupling a first guided mode into a cladding mode supported by the inner cladding layer.

13. The method of claim 12, wherein:
coupling at least some of the light from the core mode into the cladding mode further comprises coupling a first propagation mode with the CFBG into one or more counter-propagating cladding modes supported by the inner cladding layer of the second first length of fiber.

14. The method of claim 12, wherein coupling at least some of the light from the core mode into the cladding mode further comprises coupling a first propagation mode with the LPFG into one or more co-propagating cladding modes supported by the inner cladding layer of the second length of fiber.

15. The method of claim 12, further comprising stripping the cladding mode from the inner cladding layer over a third length of fiber.

* * * * *